United States Patent [19]

Schreiner et al.

[11] Patent Number: 4,543,223

[45] Date of Patent: Sep. 24, 1985

[54] METHOD FOR THE DRY MOLDING OF FORMED PARTS

[75] Inventors: Horst Schreiner; Bernhard Rothkegel, both of Nuremberg, Fed. Rep. of Germany

[73] Assignee: Siemens Aktiengesellschaft, Munich, Fed. Rep. of Germany

[21] Appl. No.: 561,080

[22] Filed: Dec. 14, 1983

Related U.S. Application Data

[63] Continuation-in-part of Ser. No. 353,254, Mar. 1, 1982, abandoned, which is a continuation of Ser. No. 176,331, Aug. 8, 1980, abandoned.

[30] Foreign Application Priority Data

Aug. 9, 1979 [DE] Fed. Rep. of Germany ....... 2932420

[51] Int. Cl.[4] ............ B29J 5/00

[52] U.S. Cl. ............ 264/120; 425/433

[58] Field of Search ............ 264/120, 40–44, 264/109; 425/261, 433, DIG. 201

[56] References Cited

U.S. PATENT DOCUMENTS

| | | | |
|---|---|---|---|
| 3,677,674 | 7/1972 | Bowles | 425/261 |
| 4,080,128 | 3/1978 | Schreiner et al. | 425/78 |

*Primary Examiner*—Donald Czaja

*Assistant Examiner*—V. Fischbach

*Attorney, Agent, or Firm*—Kenyon & Kenyon

[57] ABSTRACT

In a method for molding formed parts in automatic multiposition presses, using powdered materials having a flowability characterized by a flow time exceeding 60 seconds per 100 g of powder flowing from a 60° standard funnel with a nozzle aperture of 4 mm and a nozzle length of 4 mm, the powdered material having in the mold a filling height to diameter ratio larger than two, the powder is conveyed into the mold by means of filling devices located at a plurality of separate charging stations, pressed at a separate pressing station and ejected at yet another separate station. The filling heights in each mold is subdivided into at least two individual filling heights so that the filling of the mold to these individual filling heights can be carried out at different charging stations.

6 Claims, 9 Drawing Figures

METHOD FOR THE DRY MOLDING OF FORMED PARTS

CROSS REFERENCE TO RELATED APPLICATIONS

This application is a continuation-in-part of U.S. patent application Ser. No. 353,253, filed Mar. 1, 1982 and now abandoned, in turn a continuation of U.S. Pat. application Ser. No. 176,331, filed Aug. 8, 1980 and now abandoned.

BACKGROUND OF THE INVENTION

This invention relates to a method for the dry molding of formed parts in automatic presses using powdered materials having a flowability characterized by a flow time of more than 60 seconds per 100 g of powder flowing from a 60° standard funnel with a nozzle aperture of 4 mm and a nozzle length of 4 mm. The powder is conveyed into the mold of a press tool with a lower and an upper punch, by means of a filling device at a first operating position, is pressed in a separate second operating position, and at a separate third operating position, the finished molded parts are ejected. During an operating cycle the operation positions are successively assumed in stepwise fashion by the lower and the upper punch and the associated mold or die cavity containing the powder.

An important objective in the mass production of pressed powder parts in automatic presses is a small mass tolerance. For parts of a given size, the flow properties of a powder improve with decreasing tolerance. The flow properties are characterized by the time required for the powder to flow from a 60° standard funnel with a nozzle aperture of 4 mm and a nozzle length of 4 mm. Customarily, the flow time is given in seconds per 100 g of powder. The flow properties of highly flowable powders are characterized by a flow time of approximately 20 seconds per 100 g of powder. Frequently, starting powders with poorer flow properties must also be processed in automatic presses. Such powders can be brought into a more flowable form by known granulating processes such as mechanical granulation, thermal granulation, and by granulating additives or by spray drying. Various powders have poor flowability and even after being subjected to the different granulating processes have flow properties of more than 60 seconds per 100 g of powder. The production of pressed (molded) bodies of material in powder form in automatic presses is described, for instance, in U.S. Pat. No. 4,080,128.

It is therefore an object of the invention to improve the known methods of producing molded bodies through the application of pressure so that it is possible to process materials in powder form such as metal powder, ceramic powders, metal oxide powders or mixed powders with different components, with a flow behavior of more than 60 seconds per 100 g of powder, in automatic presses, into molded parts with small weight or mass tolerances.

SUMMARY OF THE INVENTION

According to the present invention, this object is attained by subdividing the entire filling height in the mold into at least two individual filling heights in such a manner that the filling to the individual filling heights is carried out at different filling positions.

One influential factor in filling a press mold is, in addition to the size, for instance, the diameter and the height to diameter ratio of the mold. In particular, formed parts having a geometry which results from the given ratio of a filling height to diameter of more than 2 are to be pressed in accordance with the method of the present invention. In the case of hollow parts, the ratio of filling height to wall thickness is the important factor. In the case of geometries unfavorable for pressing, the ratio of filling height to diameter or filling height to wall thickness can be more than 10.

In the case of poorly flowing powders with a flow behavior of more than 60 seconds per 100 g of powder, a cavity is frequently generated within the powder in the filling container if only one filling device is used. Even if the filling container is vibrated, it takes a certain amount of time to replenish the powder layer in the filling container. By subdividing the filling height according to the present invention, only enough powder for the individual process, for instance, half the filling height is required in one filling position. As a result the follow up flow of the powder is no longer disturbing. In addition, the time for the filling process for filling half the filling height is reduced to about half the value. For the hollow parts described, the time is then comparable to that required for the pressing process. By subdividing a high filling space into two or more filling heights, one gets into an advantageous range for the cycle time when pressing in automatic multiposition presses and, therefore, into the range of particularly efficient production.

DETAILED DESCRIPTION OF THE INVENTION

Figure 1:
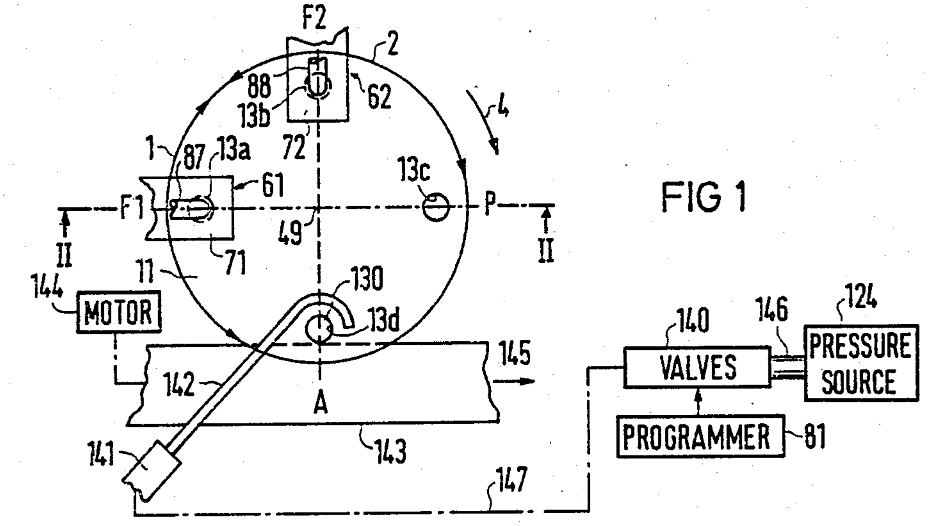
FIG. 1 is a partial generally schematic top view of an automatic multiposition press utilizing the method in accordance with the present invention.

As illustrated in FIG. 1, a multiposition press operating in accordance with the present invention comprises a turntable 11 advantageously provided with four angularly equispaced cylindrical molds or die cavities 13*a*, 13*b*, 13*c*, and 13*d*. The press is provided with four work stations F1, F2, P and A disposed about the periphery of turntable 11 in a uniform distribution having a common angle of 90° subtended between any two adjacent work stations. These four work stations consist of two filling or charging stations F1 and F2, a pressing station P and an ejecting station A.

As described in detail hereinafter with reference to FIG. 2, the automatic press is provided with a programmer controlled drive 51 for intermittently rotating turntable 11 in the direction of an arrow 4 about a vertical axis 49. The intermittent or stepwise rotation of turntable 11 causes each mold 13*a*–13*d* to be temporarily stoped at each work station F1, F2, P and A one time during each cycle of rotation of the turntable.

In accordance with the present invention each mold 13*a* through 13*d* is divided into at least two individual filling heights. Each molding cycle, corresponding to a single rotation of turntable 11 about axis 49, commences with a plurality of filling steps each taking place at a respective charging station. As shown in FIG. 1, each charging station F1 and F2 is provided with a respective filling device 61 and 62 for conveying pattern material, e.g. metal powder, ceramic powder, metal oxide powder or mixtures of powders, into the molds 13*a* through 13*d* of the automatic press.

Figure 2:
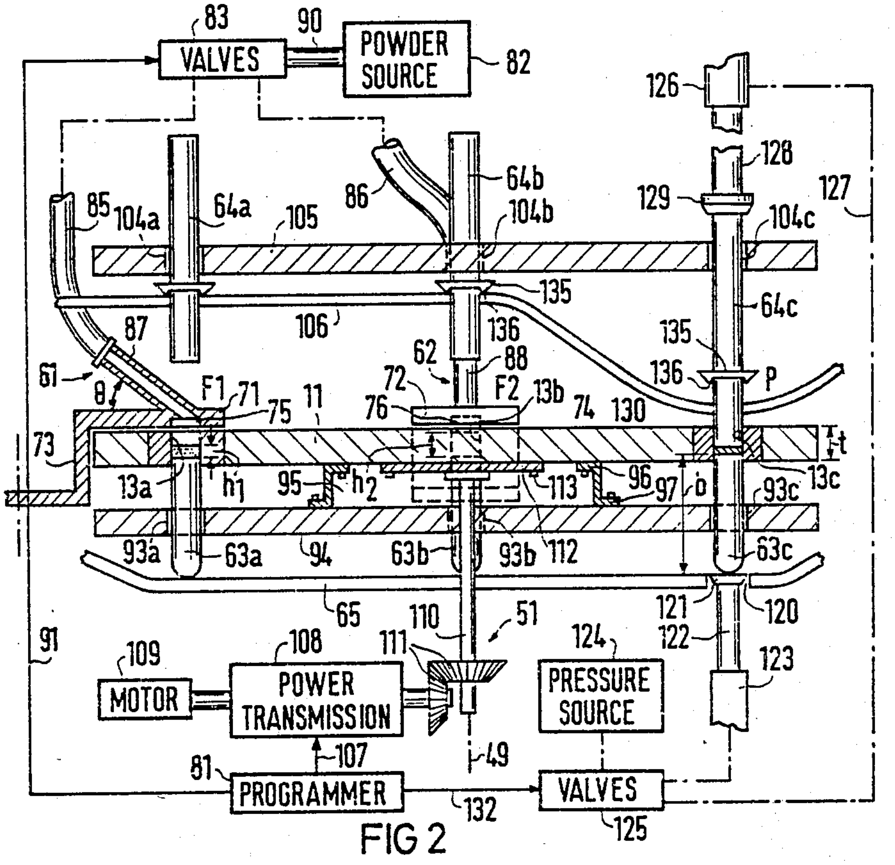
FIG. 2 is a cross sectional view taken along line II—II in FIG. 1.

As illustrated in FIG. 2, each mold of the press of FIG. 1, in particular molds 13*a*, 13*b*, and 13*c*, is provided with a respective lower punger 63*a*, 63*b* and 63*c* and a respective upper plunger 64*a*, 64*b* and 64*c*. The lower plungers rest on a camming track or rail 65 having a varying distance d from turntable 11. This distance is smallest at ejecting station A and is selected for that station so that the thickness of turntable 11 plus the distance of camming track 65 from the lower surface of the turntable is exactly equal to the height h of the lower plungers. Camming track 65 slopes downwardly from ejecting station A to charging station F1 with the consequence that, upon the moving of a mold from ejecting station A to charging station F1, the lower plunger associated with the mold is gradually and continuously lowered from the upper limiting position at the ejecting station to a lower position at charging station F1.

Filling devices 61 and 62 comprise respective rectangular plates 71 and 72 overlying turntable 11 in the regions of charging stations F1 and F2. Each plate 71 and 72 is formed with a cross-sectionally L shaped flange 73 and 74 for securing the respective filling device 61 and 62 to a non-illustrated stationary fixture and has a circular recess 75 and 76 juxtaposed to turntable 11 at charging stations F1 and F2, respectively.

Recesses 75 and 76 communicate, under the control of a programmer 81, with a pressurized powder source 82 via a set of valves 83, respective hoses 85 and 86 and respective pipes 87 and 88. Pipes 87 and 88 are integral with plates 71 and 72 and extend outwardly at an angle $\theta$ with respect to turntable 11.

Valves 83 are electromagnetic valves connected to powder source 82 via a conduit or manifold 90. In response to signals arriving from programmer 81 via a multiple 91, valves 83 open temporarily to permit the passage of powder material from source or reservoir 82 to recesses 75 and 76 through hoses 85 and 86 and pipes 87 and 88. The amount of powdered material flowing from powdered source 82 to the mold at filling station F1 under the control of programmer 81 is the amount of powdered material required to fill the mold to a first filling height $h_1$ measured with respect to the planar top surface of the respective lower plunger. Similarly, the amount of powdered material flowing from the powdered source to the mold at charging station F2 is the amount of material required to fill that mold to a second filling height $h_2$ measured with respect to the top surface of the respective lower plunger. As illustrated in FIG. 2, the lower plungers travel on a straight section of camming track 65 between filling or charging stations F1 and F2 and between filling station F2 and pressing station P. The lower plungers, in particular lower plungers 63*a*, 63*b* and 63*c* traverse respective apertures or bores 93*a*, 93*b* and 93*c* in a circular plate 94 attached to the underside of turntable 11 via a cylinder 95 having at its ends a pair of horizontally extending angular flanges 96 and 97. In analogous fashion upper plungers 64*a*, 64*b* and 64*c* traverse respective apertures or bores 104*a*, 104*b* and 104*c* in a circular guide plate 105 rigid with turntable 11. Upper guide plate 105 and lower guide plate 94 serve to keep upper plungers 64*a*, 64*b* and 64*c* and lower plungers 63*a*, 63*b* and 63*c* in alignment with the respective molds 13*a*, 13*b* and 13*c* during the rotation of turntable 11 and also provide a driving force for pushing upper plungers 64*a*, 64*b* and 64*c* along an upper camming rail 106 and lower plungers 63*a*, 63*b* and 63*c* along camming track 65.

As illustrated in FIG. 2, programmer 81 has an output multiple 107 extending to a power transmission 108 for controlling the times at which rotary power is transmitted from a motor 109 to a drive shaft 110 via a pair enmeshed bevel gears 111. Shaft 110 is rigid with a connecting plate 112 in turn attached to turntable 11 via bolts 113.

Upon the arrival of the molds of turntable 11 at filling stations F1 and F2, pressing station P and ejecting station A, programmer 81 causes transmission 108 to disengage motor 109 from drive shaft 110, thereby arresting the motion of turntable 11, and induces a pair of valves in valves set 83 to open, thereby permitting the flow of powder material from powder source 82 to the molds at filling stations F1 and F2. The valves in valve set 83 remain open for times determined in part by individual filling heights $h_1$ and $h_2$. Upon the closing of the valves and the termination of the filling processes at charging stations F1 and F2 (the filling processes naturally having a longer duration than the pressing process at station P and the ejecting process at station A), programmer 81 generates signals on multiple 107 for causing transmission 108 to connect motor 109 to drive shaft 110.

Camming track 65 is provided with a gap 120 at pressing station P for accommodating a plunger head 121 and a plunger shaft 122 of a hydraulic cylinder 123. Cylinder 123 is charged or pressurized by a fluid pressure source 124 via electromagnetic valves 125 whose operating states are determined by programmer 81. Associated with upper plunger 64*c* is a second hydraulic cylinder 126 connected to valves 125 via a conduit 127 and having a plunger 128 whose plunger head 129 is engagable with an upper surface of upper plunger 64*c* for forcing the plunger downwardly into mold 13*c* to compress the powdered material therein into a compacted plate 130. Upon the termination of a 90° rotation of turntable 11, programmer 81 actuates valves 125 via a multiple 132 to pressurize hydraulic cylinders 123 and 126 and consequently extend plunger shafts 122 and 128 towards turntable 11.

Camming track 65 and camming rail 106 are located in a cylindrical area proximate to the periphery of turntable 11. The upper plungers are each provided with a respective collar 135 having on its outer side a downwardly facing bead 136 for engaging an upper surface of camming rail 106. Camming rail 106 takes a dip at pressing station P. As a filled mold approaches station P during a 90° rotation step of turntable 11, rail 106 gradually lowers into the mold the upper plunger associated therewith.

Camming track 65 is sloped upwardly from the pressing station P to ejecting station A, whereby, upon the completion of a pressing step and the subsequent rotation of turntable 11, the lower plunger upon which a compacted plate 130 rests is moved upwardly to the upper limiting position of the plunger. Upon the attainment of this upper limiting position and the arrival of the plunger and its associated mold at an ejecting station A, programmer 81 operates an electromagnetic valve 140 to cause a hydraulic cylinder 141 operatively connected thereto to retract its hooked shaped plunger 142. Upon being retracted hooked shaped plunger 142 engages a compacted plate 130 level with the upper surface of turntable 11 at ejecting station A and slides the compacted plate off the turntable onto a belt conveyer 143 driven by a motor 144 in the direction indicated by arrow 145. As shown in FIG. 1, valve 140 is connected to pressure source 124 via a conduit 146 and to hydraulic cylinder 141 via a duct 147.

Figure 3:
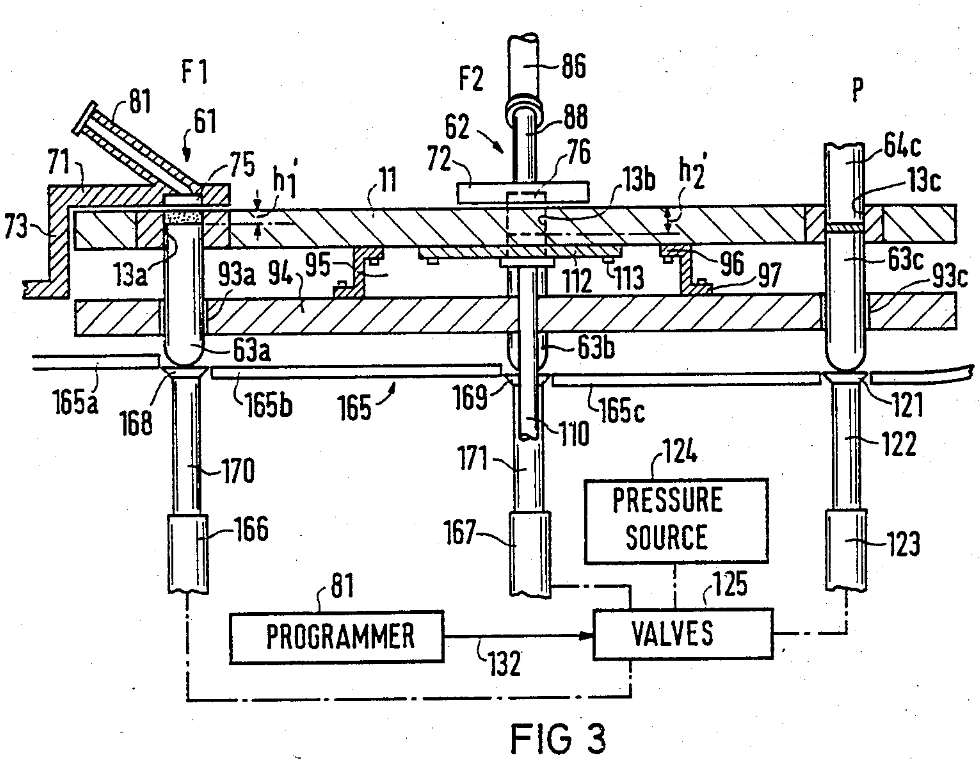
FIG. 3 is a cross-sectional view similar to FIG. 2, showing a portion of an automatic multiposition press having a pair of filling or charging stations and operating in accordance with the method of the present invention.
Figure 4B:
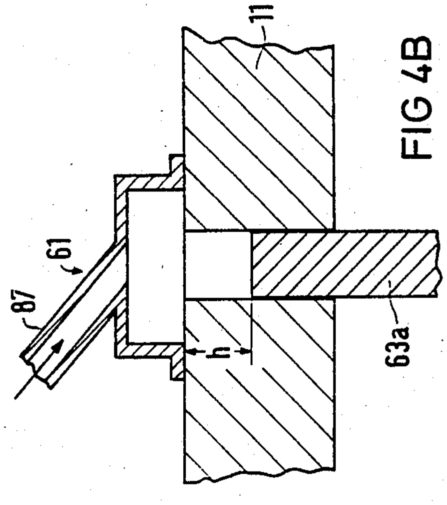
FIGS. 4*a* and 4*b* are detailed views, on an enlarged scale, of the multiposition press of FIG. 3, showing two operating phases at a filling station of the multiposition press.
Figure 4A:
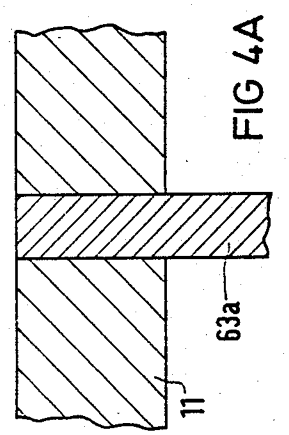

As illustrated in FIG. 3, an automatic multiposition press operating in accordance with the present invention is advantageously provided with a sectionalized lower camming track or rail 165 and hydraulic cylinders 166 and 167 at filling or charging stations F1 and F2, respectively. Camming track 165 includes a pair of straight track sections 165*a* and 165*b* vertically staggered with respect to one another by distance equal to a first filling height $h_1'$ and horizontally spaced from one another by a distance equal to the upper surface of a plunger head 168 of hydraulic cylinder 166, track sections 165*a* and 165*b* being disposed on opposite sides of the plunger located at filling stations F1 during the execution of a filling process. Track section 165*b* and a third horizontally level track section 165*c* of camming track 165 are similarly vertically staggered with respect to one another by a distance equal to the difference between a second individual filling height $h_2'$ and the first individual filling height $h_1'$ and horizontally spaced with respect to one another by a distance equal to the width of a plunger head 169 of hydraulic cylinder 167, track sections 165*b* and 165*c* being disposed on opposite sides of a lower plunger located at filling stations F2 during the performance of a filling process. Upon the termination of a 90° rotation of turntable 11, programmer 81 generates on multiple 132 signals for gradually opening valves in valve set 125 operatively connected to hydraulic cylinders 166 and 167, thereby causing these cylinders to slowly retrack respective plungers 170 and 171. Simultaneously with generating these valve opening signals on multiple 132 programmer 81 generates on multiple 91 (see FIG. 2) signals for opening valves in valve set 83 and thereby opening flow paths between powder source 82 and recesses 75 and 76 in filling devices 61 and 62. Simultaneously lowering the lower plungers and conveying powered material to the molds and filling stations F1 and F2 ensures better packing of the powdered material prior to pressing and station P, i.e., ensures that no cavities are formed in the powdered material prior to pressing. FIGS. 4*a* and 4*b* show the location of a lower plunger in an associated mold at the beginnning and the end of the filling process at filling station F1.

Figure 5:
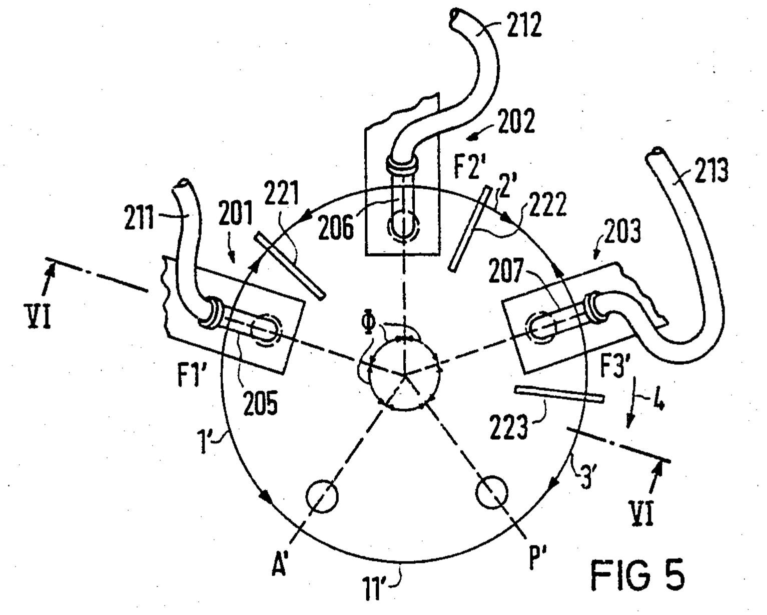
FIG. 5 is a partial top view of another automatic multiposition press operating in accordance with the method of the present invention, showing three filling or charging stations.

As illustrated in FIG. 5, an automatic multiposition press operating in accordance with the present invention may have three filling or charging stations F1′, F2′ and F3′, as well as a pressing station P′ and an ejecting station A′. These work stations F1′, F2′, F3′, P′, A′ are disposed about the periphery of a turntable 11′ in a uniform distribution having a common angle $\phi$ subtended between any two adjacent work stations. Disposed at charging stations F′, F2′ and F3′ are filling devices 201, 202 and 203 which include, as heretofore described with respect to FIG. 2, respective angled pipes 205, 206 and 207 and respective hoses 211, 212 and 213 extending to a non-illustrated pressure source via a valve set controlled by a programmer (not shown).

Figure 6C:
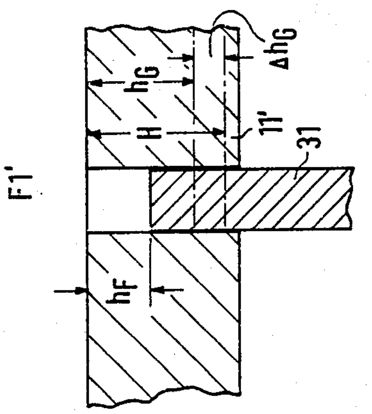
FIGS. 6*a*, 6*b* and 6*c* are partial cross-sectional views taken along line VI—VI in FIG. 5, showing three operating phases at a charging station of the multiposition press of FIG. 5.
Figure 6B:
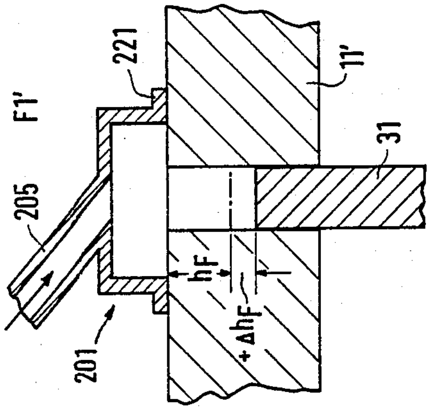
Figure 6A:
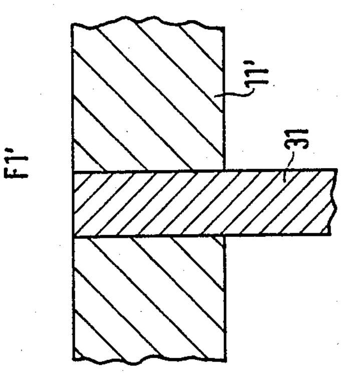

Upon the termination of a rotation step of turntable 11′, a lower plunger 31 (FIGS. 6, 6*b* and 6*c*) associated with the mold disposed at charging station F1′ is lowered by a hydraulic cylinder such as cylinder 166 in FIG. 3 under the control of the programmer from an uppermost or upper limiting position shown in FIG. 6*a* to a position shown in FIG. 6*b*, this position corresponding to a first individual filling height. Powdered material may be conveyed into the mold at filling station F1′ either during the lowering of plunger 31, as heretofore described with respect to FIG. 3, or only upon the attainment by plunger 31 of the position show in FIG. 6*b*. Upon the termination of the filling process, i.e., upon the stopping of powder flow through hose 211 and pipe 205, lower plunger 31 is raised from the position of FIG. 6*b* by a distance $\Delta h_F$. The raising of plunger 31 results in some powdered material being pushed out of the mold at filling station F1′, the powdered material remaining in the mold occupying a filling height $h_F$ (see FIG. 6*c*).

Upon the decrease of the filling height of the powdered material in the mold at charging station F1′, turntable 11′ undergoes another stepwise rotation, the mold just filled at charging staion F1′ being disposed at station F2′ upon the completion of the rotation step. At station F2′ lower plunger 31 is lowered to a lowermost position corresponding to a filling height H equal to the sum of another filling height $h_G$ plus an incremental distance $\Delta h_G$ (see FIG. 6*c*). Powder material is then conveyed to the mold via hose 212 and pipe 206, whereupon lower plunger is raised the distance $\Delta h_G$ from the position corresponding to filling height H to the position corresponding to filling height $h_G$. After this adjustment in the vertical position of plunger 31, turntable 11 is again subjected to a stepwise rotation bringing the mold from station F2′ to station F3′. Flaps, webs or sheets 221, 222 and 223 are provided downstream of charging stations F1′, F2′ and F3′, respectively, for wiping or sweeping excess powder from the surface of turntable 11′.

The double arrowed circle segments 1 and 2 in FIG. 1 and 1′, 2′ and 3′ in FIG. 5 indicate the regions for the time cycles of the filling steps in the respective automatic multiposition presses.

Instead of powder source 82 (see FIG. 2), filling devices 61 and 62 may have powder containers or reservoirs, flow of the powder being achieved by means of gravity. In order to keep the powder columns contained in the filling containers constant, inclined baffles are usually arranged in the filling containers. Furthermore, raster shaped plates are arranged at the bottoms of the containers so that the filling wedges are reduced when the containers are moved over die or mold openings or, alternatively, when the molds are moved under the filling containers.

What is claimed is:

1. In a method for the dry molding of formed parts of materials in powder form in a rotatable automatic press having a press tool with at least one mold and a lower and an upper punch associated therewith, said method comprising the steps of:

(a) automatically conveying powdered material into said mold at a first operating position;

(b) automatically rotating said press tool and thereby moving said mold to a second operating position;

(c) automatically pressing the powdered material in said mold at said second operating position to form a finished molded part;

(d) automatically rotating said press tool and thereby moving said mold to a third operating position, the steps of automatically rotating said press tool being accomplished in stepwise fashion to bring said mold together with said lower and said upper punch successively to at least some of the operating positons during each operating cycle of said automatic press; and (e) automatically ejecting the finished molded part at said third operating position; an improved method of molding a formed part from powdered material having in the mold a precompaction geometry with a filling height to diameter ratio which is greater than two, said powdered material being amenable to bonding under adequately applied pressure and having a flowability characterized by a flow time exceeding 60 seconds per 100 g of powder flowing from a 60° standard funnel with a nozzle aperture of 4 mm and a nozzle length of 4 mm, said improved method comprising the additonal steps of:

(f) prior to an initial execution of step (a), providing an additional operating position between the first and second operating position;

(g) prior to an initial execution of step (a), providing the mold with at least two individual filling heights, step (a) including automatically filling the mold with the powdered material to a first of the individual filling heights at said first operating position;

(h) upon the execution of step (a), automatically rotating the press tool and thereby moving said mold to said additonal operating position;

(i) upon the execution of step (h), automatically filling said mold with the same powdered material at least to a second of the individual filling heights at said additional operating position, step (b) through (e) taking place upon the completion of step (i), steps (h) and (i) taking place immediately upon completion of step (g) so that two consecutive filling steps at different operating positions occur prior to the pressing of step (c); and (j) repeating steps (a), (h) and (i) and steps (b) through (e).

2. The improved method defined in claim 1 wherein said mold has a filling opening and wherein steps (a) and (i) comprise disposing a filling device over said mold and lowering said lower punch when said filling device containing the powder is over the filling opening.

3. The improved method defined in claim 1 wherein step (a) includes the step, executed upon the conveying of powdered material into said mold at said first operating position, of raising the lower punch from a first charging position to a second charging position corresponding to said first individual filling height and wherein step (i) includes the step, executed upon the conveying of powdered material into said mold at said additional operating position, of raising lower punch from a third charging position to a fourth charging position corresponding to said second individual filling height.

4. In a method for the dry molding of formed parts of materials in powder form in a rotatable automatic press, which method includes:

(a) automatically conveying the powder into a mold of a press tool with a lower and an upper punch by means of a filling device, at a first operating position;

(b) automatically pressing the powder at a separate second operating position to form a finished molded part;

(c) automatically ejecting the finished molded part at a third operating position; and (d) automatically rotating said press tool in stepwise fashion to bring said mold together with said lower and said upper punch successively to each of said operating positions during each operating cycle of said automatic press, an improved method of molding a formed part from powdered material having in the mold a precompaction geometry with a filling height to diameter ratio which is greater than two, said powdered material being amenable to bonding under adequately applied pressure and having a flowability characterized by a flow time exceeding 60 seconds per 100 g of powder flowing from a 60° standard funnel with a nozzle aperture of 4 mm and a nozzle length of 4 mm, said improved method comprising the steps of:

(e) providing an additional operating position between the first and the second operating position;

(f) dividing the filling height in the mold into at least two individual filling heights;

(g) automatically filling the mold with the powdered material to a first of the individual filling heights at said first operating position;

(h) automatically rotating the press tool and thereby moving the mold to additional operating position;

(i) automatically filling said mold with the same powdered material at least to a second of the filling heights at said additional operating position;

(j) automatically rotating said press tool and thereby moving said mold to said second operating position;

(k) automatically pressing the powder in said mold at said second operating position to form a molded part, steps (h) and (i) taking place immediately upon completion of step (g) so that two consecutive filling steps at different operating positions occur prior to the pressing of step (k);

(l) automatically rotating said press tool and thereby moving said mold to the third operating position;

(m) automatically ejecting the molded part at said third operating position; and (n) repeating steps (g) through (m).

5. The improved method defined in claim 4 wherein step (f) includes dividing the filling height in the mold into at least four individual filling heights, further comprising the step of raising the lower punch, upon completion of step (g), to decrease the filling height of the powdered material in said mold from the first of the individual filling heights to a smaller third individual filling height, and the step of raising the lower punch, upon the completion of step (i), to decrease the individual filling height of the powdered material in said mold from the second of the individual filling heights to a fourth individual filling height.

6. The improved method defined in claim 4 wherein said mold has a filling opening and wherein steps (a) and (i) comprise disposing a filling device over said mold and lowering said lower punch when said filling device containing the powder is over the filling opening.

* * * * *